Aug. 16, 1966    J. D. STACHIW    3,266,657
SEALING OF INTERNAL HIGH PRESSURE VESSELS
Filed May 5, 1964    2 Sheets-Sheet 1

J. D. STACHIW
INVENTOR.

BY
*J. C. Muller*
ATTORNEY

Aug. 16, 1966   J. D. STACHIW   3,266,657
SEALING OF INTERNAL HIGH PRESSURE VESSELS

Filed May 5, 1964   2 Sheets-Sheet 2

J. D. STACHIW
INVENTOR.

BY

*J. E. Mueller*
ATTORNEY

3,266,657
SEALING OF INTERNAL HIGH PRESSURE VESSELS
Jaroslaw D. Stachiw, State College, Pa., assignor, by mesne assignments, to the United States of America as represented by the Secretary of the Navy
Filed May 5, 1964, Ser. No. 365,222
3 Claims. (Cl. 220—46)

This invention relates to sealing of covers for tanks containing gas or fluid under high pressure and in particular to the sealing of such covers under circumstances where there is considerable clearance between the cover and the tank body.

Prior solutions to sealing covers of tanks required a close fit between the cover and the flange of the tank. The higher the pressure contained within the tank, the less the actual clearance was permissible. Seals used today, relying on actual compression for their sealing effect can seldom tolerate more than .001 to .0001 inch between the mating surface of cover and tank. If the bolts holding the cover to the flanges of the tank stretch, permitting some clearance between the mating surfaces, the seal between these elements will frequently blow out.

This invention provides a new axial seal which permits the sealing of a high pressure tank if the clearance between the cover and the tank flange or seat is excessive, that is up to one-eighth inch or more. The present invention utilizes a metal retaining ring assembly containing a protruding flexible sealing ring that moves upward from a groove within the tank. This assembly is forced against the cover by a fluid or gas under pressure injected in the groove behind the assembly. Since the metal retaining ring assembly moves up with the cover, it fills the gap between the cover and the tank flange, preventing the flexible ring from blowing out.

It is an object of this invention, therefore, to provide a seal for high pressure tanks which will effectively prevent leaks when there is a clearance between the tank cover and the tank.

Another object of this invention is to provide a seal which will operate satisfactorily when minute particles of dirt are trapped between the tank cover and the flange or seat so as to make it inoperable.

Still another object of this invention is to provide a seal having a metal-to-metal contact for secure containment of a sealing gasket.

Yet another object of this invention is to provide a seal having a self-adjusting follower which permits unusually large clearance between the cover and the seat.

These and other objects of this invention will be apparent from the consideration of the construction and arrangement illustrated in the accompanying drawings wherein.

Figure 1:
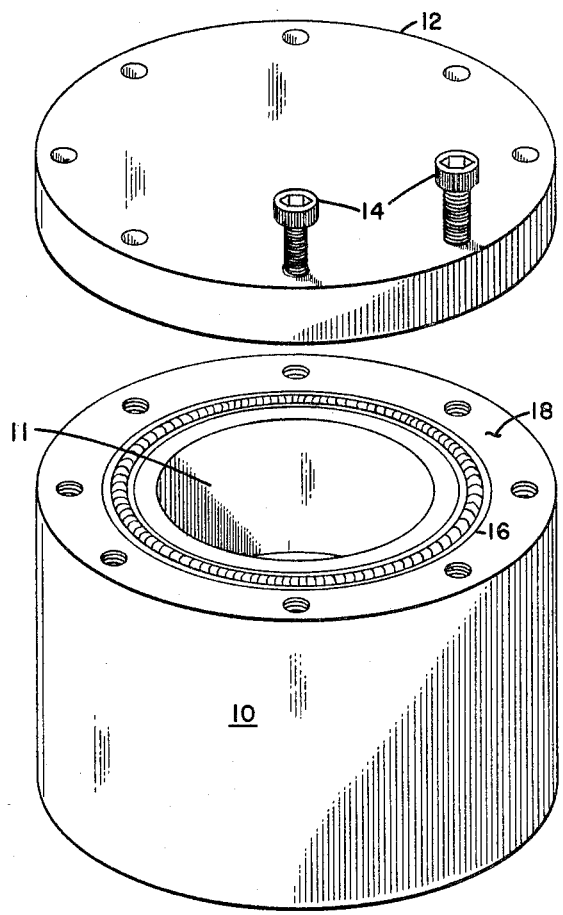
FIGURE 1 is an exploded perspective view of a pressure vessel with its cover removed showing an embodiment of the present invention installed within the seat of the pressure vessel.
Figure 2:
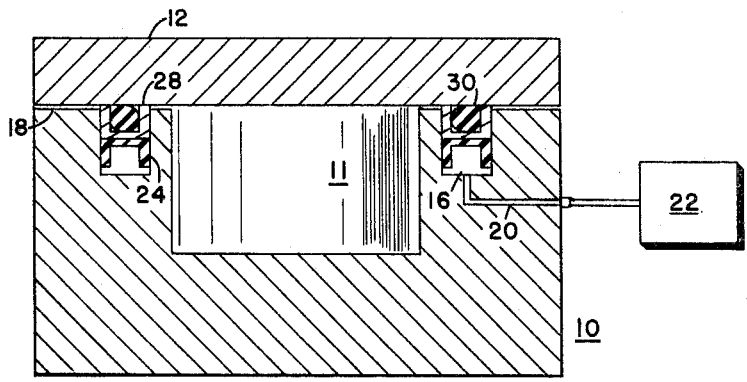
FIGURE 2 is a cross-section view of the pressure vessel of FIGURE 1 with the cover in place.
Figure 3:
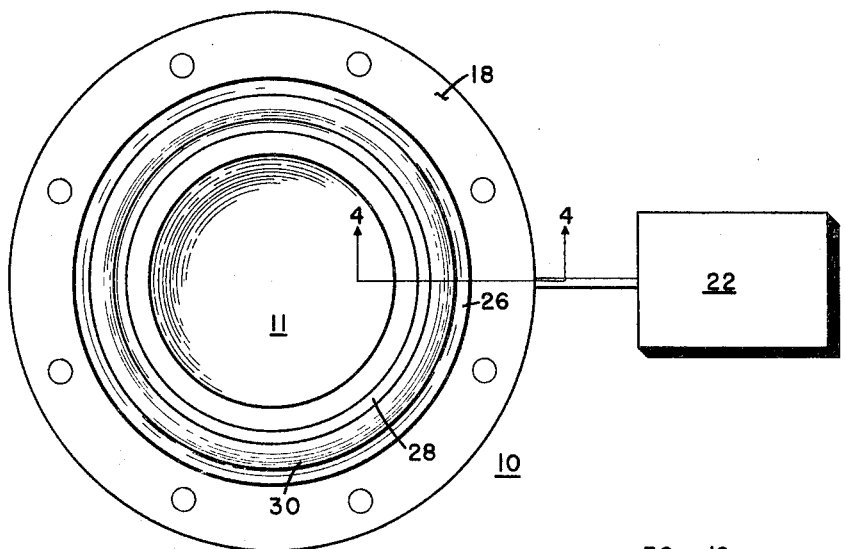
FIGURE 3 is a top plan view of the seat portion of the pressure vessel.

Referring now to FIGURES 1, 2, and 3, 10 represents a high pressure vessel or tank with an internal chamber 11. Cover 12 is positionable on seat 18 located on the open end portion of tank 10. Cover 12 is secured to tank 10 by means of bolts 14 which pass through the cover 12 and screw into tank 10. The embodiment of the present invention is contained within an upwardly disposed circular groove 16 positioned within seat 18 facing cover 12. A passage 20 extends from the bottom portion of groove 16 through tank 10 to a pressurized hydrostatic fluid source 22 located outside of the tank 10.

Figure 4:
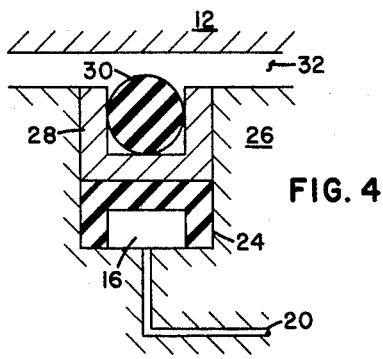
FIGURE 4 is a cross-sectional view taken along line 4—4 of FIGURE 3 showing the cover not in place.

Referring now to FIGURE 4, 24 represents an annular rubber gasket positioned within the bottom portion of groove 16. A slideable circular container 26 with side elements 28 is positioned on top of gasket 24 within groove 16. Container 26 has the shape of an open-top circular box with an upwardly disposed open side facing the cover 12. A deformable sealing ring 30 is positioned in container 26 and extends above side elements 28. Sealing ring 30 is comprised of rubber or a deformable plastic suitable for sealing purposes. When in its uncompressed position, sealing ring 30 extends beyond the side elements 28 by 10 to 50 percent of its diameter. Thus when cover 12 is in position, sealing ring 30 is compressed to seal the gap 32 between cover 12 and tank 10.

In operation, when it is desired to seal tank 10, cover 12 is secured to the tank by means of bolts 14. The hydrostatic fluid pressure source 22 is activated causing fluid under pressure to flow through passage 20 and into groove 16. The gasket 24 presses against container 26 forcing it upward till the side elements 28 contact cover 12 and ring 30 is compressed. Gasket 24 also prevents hydrostatic fluid from leaking into the upper portion of groove 16. The pressure of sealing ring 30 pressing against cover 12, seals the gap 32 between cover 12 and tank 10 preventing high pressure gas within chamber 11 from seeping out. Side elements 28 prevent ring 30 from being extruded and blowing out.

Figure 5:
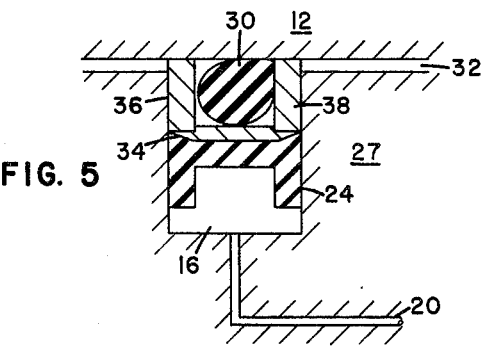
FIGURE 5 is a cross-sectional view of FIGURE 4 showing an alternate design of the subject invention with the cover in place.
Figure 6:
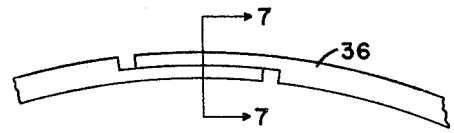
FIGURE 6 is a top plan view of a portion of the split ring element of FIGURE 5
Figure 7:
FIGURE 7 is a cross-sectional view of the ring element taken along line 7—7 of FIGURE 6.

Referring now to FIGURE 5, an alternate embodiment of the invention is shown in which ring container 27 has a flat circular base element 34 resting on gasket 24. On the outer and inner radius of base element 34 are vertically positioned inner ring 36 and outer ring 38. Both rings 36 and 38 are of a split ring design [see FIGURES 6 and 7] which tend to bear outwardly when seated, thus assuring a close fit. The mating end portions of rings 36 and 38 overlap so that expansion is possible without leakage occurring. This split ring design eliminates all tight dimensioning and at the same time assures an extrusion-proof seal.

The operation of this embodiment of the invention is similar to that represented in FIGURE 4. When it is desired to seal chamber 11, fluid pressure from source 22 is injected into groove 16 through passage 20 thus forcing gasket 24 upwards against the base element 34. The rising action of the base element 34 raises the container 27. Base element 34 continues to rise till the outer ring 38 and inner 36 contact cover 12 thus stopping further upward motion of the assembly. The upward movement compresses the ring 30 against cover 12. The seal is now complete and the chamber 11 may be pressurized. The higher the pressure in chamber 11, the higher the pressure of source 22 must be. When a gap 32 appears between cover 12 and seat 18, the ring 30 has a tendency to extrude and be forced outwardly by the pressure within chamber 11. This, however, is not possible for the metal-to-metal contact of rings 36 and 38 with the cover 12 prevents this extrusion.

Thus, as may be seen, there exists a metal-to-metal contact in all places where the gasket 24 or the ring 30 attempts to extrude. This feature makes this joint usable theoretically for pressures of any magnitude, and still allows for a considerable clearance between the seat 18 and the cover 12. The groove 16 does not require tight dimensioning, a tolerance of ±1/100 inch on the width being quite permissible.

In operation and test, pressures of 2000 p.s.i. within the chamber 11 were contained by utilizing a sealing pressure of 500 p.s.i. in source 22 while having a gap of 1/8 inch between the vessel 10 and cover 12. No sign of leaks were detected. Pressures up to 5000 p.s.i. or more may be used to seal internal pressures of 20,000 p.s.i. or more. Gaps up to 1/2 inch or more may be sealed between cover and tank. A typical example of a test on a pressure vessel utilizing the present invention is hereinafter described.

EXAMPLE

All the elements were inserted into the groove, the groove being previously greased with DC-4 silicone grease. The tank cover was bolted on the tank body leaving a clearance of .125 inch between the tank body and the tank cover. Fittings were attached to the tank body and the tank cover and pressurizing lines connected to two separate hand pumps. The seal pressurizing pump was operated first producing a sealing hydraulic pressure of 500 p.s.i. The sealing pressure raised the pressurizing gasket, bearing block and the split rings resting on it till they contacted the cover 1/8 inch away from the tank body. Now the other pressure pump was actuated and the tank pressure brought up to 2000 p.s.i. Both the sealing and the tank pressures were left on for fifteen minutes. At the end of fifteen minutes no pressure drop was observed in the sealing hydraulic system or the tank pressure hydraulic system. Careful visual observation failed to disclose any signs of leakage from the tank proving that the proposed sealing system performs as specified.

What is claimed is:

1. A seal for a vessel adapted to maintain a high internal pressure comprising, in combination:
   (a) a high pressure vessel, said vessel having an internal chamber therewithin, said internal chamber having an opening, said vessel having a generally flat seat surface surrounding said opening, said vessel having an upwardly disposed groove recessed within said seat surface, said groove having concentric cylindrical inner and outer faces perpendicular to said seat surface and an annular bottom portion;
   (b) a source of pressurized hydrostatic fluid, said source connected to said annular bottom portion of said groove by a fluid passage;
   (c) a resilient annular gasket member slideably positioned in said groove, said gasket member having a generally U-shaped cross-sectional configuration with one leg of said U positioned adjacent said inner face of said groove, the other leg of said U positioned adjacent said outer face of said groove and the connecting portion of said U positioned toward said seat surface of said vessel;
   (d) a unitary rigid annular metallic container slideably positioned within said groove, said container having a generally U-shaped cross-sectional configuration with one side element of said U of said container positioned adjacent said inner face of said groove and the other side element of said U of said container positioned adjacent said outer face of said groove and the connecting portion of said U of said container positioned immediately adjacent said connecting portion of said gasket member;
   (e) an annular deformable sealing ring positioned substantially within said container, said ring being substantially circular in cross-sectional configuration and of such diameter as to protrude substantially above said container when not deformed and to substantially fill the interior of said container when deformed to a position entirely within said container;
   (f) a rigid metallic cover member having a generally flat inner surface, said inner surface positioned immediately adjacent said seat surface of said vessel;
   (g) a plurality of bolts secured to said vessel to retain said inner surface of said cover member upon said seat surface of said vessel; and
   (h) said vessel, said gasket member, said container, said sealing ring, and said cover member so oriented and correlated that when said cover member has been positioned and secured upon said seat surface of said vessel, said pressurized hydrostatic fluid has been utilized to press said gasket member against said container, said leg portions of said container have been pressed directly against said inner surface of said cover member and said sealing ring has been deformed to lie entirely within said container, then said internal chamber of said vessel will maintain a high internal pressure.

2. A seal for a vessel adapted to maintain a high internal pressure comprising, in combination:
   (a) a high pressure vessel, said vessel having an internal chamber therewithin, said internal chamber having an opening, said vessel having a generally flat seat surface surrounding said opening, said vessel having an upwardly disposed groove recessed within said seat surface, said groove having concentric cylindrical inner and outer faces perpendicular to said seat surface and an annular bottom portion;
   (b) a source of pressurized hydrostatic fluid, said source connected to said annular bottom portion of said groove by a fluid passage;
   (c) a resilient annular gasket member slideably positioned in said groove, said gasket member having a generally U-shaped cross-sectional configuration with one leg of said U positioned adjacent said inner face of said groove, the other leg of said U positioned adjacent said outer face of said groove and the connecting portion of said U positioned toward said seat surface of said vessel;
   (d) an annular metallic container assembly slideably positioned within said groove, said container assembly consisting of an inner cylindrical ring, an outer cylindrical ring, and an annular base member, each of said inner ring, said outer ring, and said base member formed of metal, said container assembly having a generally U-shaped cross-sectional configuration with said inner cylindrical ring positioned adajacent said inner face of said groove and said outer cylindrical ring positioned adjacent said outer face of said groove and said annular base member positioned immediately adjacent said connecting portion of said gasket member;
   (e) an annular deformable sealing ring positioned substantially within said container assembly, said ring being substantially circular in cross-sectional configuration and of such diameter as to protrude substantially above said container assembly when not deformed and to substantially fill the interior of said container assembly when deformed to a position entirely within said container assembly;
   (f) a rigid metallic cover member having a generally flat inner surface, said inner surface positioned immediately adjacent said seat surface of said vessel;
   (g) a plurality of bolts secured to said vessel to retain said inner surface of said cover member upon said seat surface of said vessel; and
   (h) said vessel, said gasket member, said container assembly, said sealing ring, and said cover member so oriented and correlated that when said cover member has been positioned and secured upon said seat surface of said vessel, said pressurized hydrostatic fluid has been utilized to press said gasket member against said container assembly, said inner and outer cylindrical rings of said container assembly have been pressed directly against said inner surface of said cover member and said sealing ring has been deformed to lie entirely within said container assembly, then said internal chamber of said vessel will maintain a high internal pressure.

3. The combination of claim 2 wherein each of said inner and outer cylindrical rings is a split ring with overlapping mating end portions.

References Cited by the Examiner

UNITED STATES PATENTS

| | | | |
|---|---|---|---|
| 2,114,381 | 4/1938 | Horner | 220—46 |
| 2,153,674 | 4/1939 | Ommundson | 220—46 |

FOREIGN PATENTS 609,400  11/1960  Canada.

THERON E. CONDON, *Primary Examiner.*

GEORGE E. LOWRANCE, *Examiner.*